United States Patent

[11] 3,577,659

| | | |
|---|---|---|
| [72] | Inventor | Karl Kail<br>Montrose, Pa. |
| [21] | Appl. No. | 847,931 |
| [22] | Filed | Aug. 6, 1969 |
| [45] | Patented | May 4, 1971 |
| [73] | Assignee | Singer-General Precision, Inc.<br>Binghamton, N.Y. |

[54] MOTION SIMULATOR ACTUATOR JOINT
7 Claims, 5 Drawing Figs.

[52] U.S. Cl. .................................................... 35/12,
248/396, 287/87
[51] Int. Cl. ........................................................ G09b 9/08
[50] Field of Search ............................................ 35/12; 64/7;
248/395, 396, 398; 74/(Inquired); 287/21, 87, 90
(B); 308/(Inquired)

[56] References Cited
UNITED STATES PATENTS

| 3,288,421 | 11/1966 | Peterson................... | 248/396 |
| 3,295,224 | 1/1967 | Cappel....................... | 35/12 |

Primary Examiner—Robert W. Michell
Assistant Examiner—Paul V. Williams
Attorneys—Francis L. Masselle, William Grobman and
Charles S. McGuire ABSTRACT: A three degree-of-freedom joint for attaching the upper end of a linear actuator to the motion platform of a six degree-of-freedom motion system. The disclosed configuration combines certain features of a ball-and-socket joint with a gimbal joint to achieve advantages and allow motion excursions not attainable with conventional joints previously used in such applications.

INVENTOR.
Karl A. Kail
BY Charles S. McGuire,
Attorney

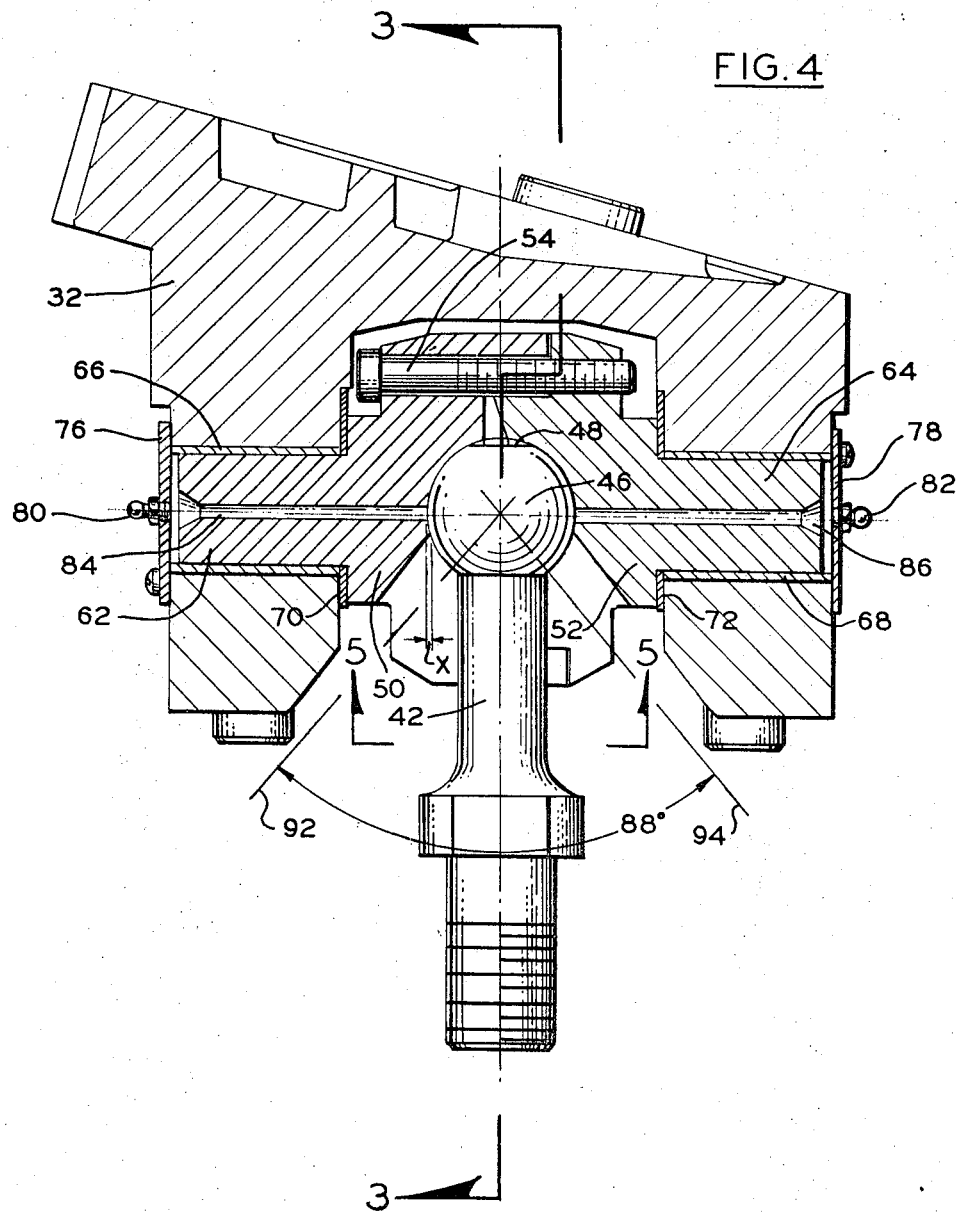

MOTION SIMULATOR ACTUATOR JOINT

This invention relates to a novel three degree-of-freedom joint especially useful in connecting linear actuators of synergistic motion systems to the motion platform and to the method of connecting an actuator rod end to a motion platform by means of such a connection.

Vehicle simulator training apparatus in current use normally includes a system for providing to the student station controlled velocities and accelerations representative of the type likely to be encountered in operation of the actual vehicle. The training value derived from the simulator is thereby greatly enhanced by duplicating to some extent the sensory stimuli experienced in an actual vehicle of the type simulated. Motion is commonly provided to the student station by controlled actuation of rigid elements, such as linear actuators and the like. Such systems may be generally classified as being either of the synergistic type, wherein movement of all actuators is required to produce movement of the student station in any one axis of freedom, or of the cascaded or independent type, wherein only one actuator need be moved to provide motion in any single axis of freedom.

Prior art motion systems of the synergistic type are typified by the motion simulator shown in U.S. Pat. No. 3,295,224, generally comprising six extensible, controlled hydraulic actuators extending between a fixed base and a motion platform. The latter is movable in six degrees-of-freedom, or combinations thereof, as the actuators are extended and retracted in a cooperative manner. The actuators are attached at their opposite ends to the base and motion platform by means of appropriate mechanical joints allowing motion in the required number of degrees of freedom. Two-axis gimbal joints, for example, are commonly employed, as are conventional ball-and-socket joints, and rotational motion about the longitudinal axis of the cylinder is sometimes provided by allowing rotation of the actuator piston within the cylinder.

The use of two-axis gimbal joints for attaching both the upper and lower ends of the actuators to the motion platform and base, respectively, offers certain advantages in simplicity of construction and ruggedness, such joints being suggested in the disclosed embodiment of the aforementioned U.S. Patent on synergistic six degree-of-freedom motion simulators. However, since both the upper and lower joints are two degree-of-freedom joints in this case, it is necessary to provide the additional degree of freedom by allowing rotation of the piston within the cylinder, as previously mentioned. Since it is desirable to place both the upper and lower sides of the piston under hydraulic pressure, as pointed out in more detail later, such rotation of the piston is likely to damage the hydraulic seals with the upper end of the cylinder. It is therefore desirable to provide a three degree-of-freedom joint at one end of each actuator to avoid the necessity of rotating the piston within the cylinder. Although a conventional ball-and-socket joint would provide the necessary three degrees-of-freedom, such joints are unsuitable in many motion simulator configurations since the joints may be in tension as well as compression and it is necessary to cut away a large portion of the socket in order to provide clearance for the piston rod as the platform is moved to the extreme limits of its excursion. Thus, there is the danger that the ball may be pulled out of the socket when the joint is heavily stressed. Three-axis gimbal joints would also provide the necessary degrees of freedom, but such joints are quite complicated and expensive in design and manufacture.

Accordingly, it is a principle object of the present invention to provide a three degree-of-freedom joint especially suitable for attaching the upper end of a linear actuator to the motion platform of a motion simulator to allow relatively wide motion excursion of the platform while remaining both economical and rugged in design.

Another object is to provide a joint having three rotational degrees-of-freedom which operates as a ball-and-socket joint in two degrees-of-freedom, and as a gimbal joint in the third.

A further object is to provide a method of attaching one end of each of a plurality of actuator rods to the motion platform of a synergistic, six degree-of-freedom motion simulator to allow greater relative motion excursions with large loads without damage to structural parts, hydraulic seals, etc.

Other objects of the invention will in part be obvious and will in part appear hereinafter.

The invention accordingly comprises the features of construction, combination of elements, and arrangement of parts, and the several steps and the relation of one or more of such steps with respect to each of the others thereof, which will be exemplified in the construction and method hereinafter set forth, and the scope of the invention will be indicated in the claims.

For a fuller understanding of the nature and objects of the invention reference should be had to the following detailed description taken in connection with the accompanying drawings, in which:

FIG. 4 is a sectional view of the joint taken at 90° to the view of FIG. 3, along the line 4–4 thereof.

Figure 1:
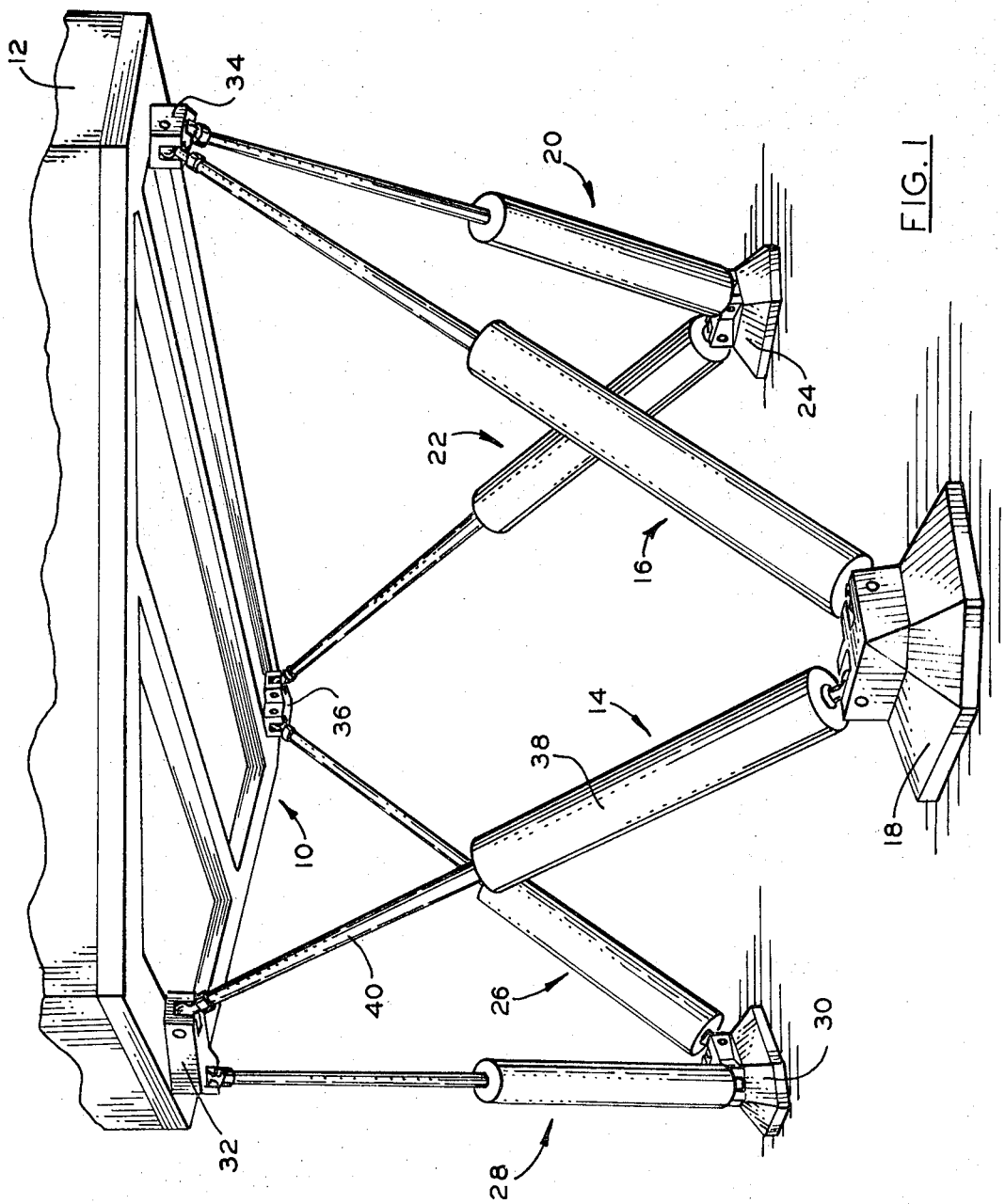
FIG. 1 is a somewhat diagrammatic, perspective view of a synergistic, six degree-of-freedom motion simulator showing the general environment of the invention.

The general configuration of the motion simulator of FIG. 1 is similar to that of aforementioned U.S. Pat. No. 3,295,224 wherein six linear actuators are connected in three pairs between the fixed base and the motion platform to provide any desired movement to the latter through synergistic operation of the actuators. The rigid motion platform is designated generally by the reference numeral 10 and is adapted to carry the student station of a vehicle trainer, such as a simulated aircraft cockpit, for example, a fragment of which is indicated by reference numeral 12. Motion actuators 14 and 16 are connected at their lower ends to a common mounting pad 18, which rests on the floor or other immovable base support. Actuators 20 and 22 are likewise connected to common mounting pad 24, and actuators 26 and 28 are connected to mounting pad 30. The joints by which the respective actuators are attached at their lower ends to the mounting pads preferably comprise conventional two-axis gimbal joints, but are not shown in detail since their construction forms no part of the present invention.

The six actuators are connected at their upper ends, by means of the novel joints of the present invention, to motion platform 10. The joints are arranged in adjacent pairs, with each pair being arranged on a common mounting structure. The three dual-joint mounts are designated in FIG. 1 by reference numerals 32, 34 and 36. Each of the six linear actuators are of identical construction, as are the upper and lower joints by which each is connected between the motion platform and base. Therefore, relevant constructional details of only one such actuator and upper joint will be considered, it being understood that the same details are applied in like portions of the motion simulator system. Actuator 14 comprises cylinder 38 and actuator rod 40 extending rigidly from a conventional piston mounted for reciprocal motion under hydraulic pressure within cylinder 38. Appropriate hydraulic connections for inlet and outlet of fluid to and from both the upper and lower ends of cylinder 38, as well as the necessary pumps, servo-actuated valves, etc. are supplied in conventional fashion and therefore are not shown in the present drawings.

Figure 2:
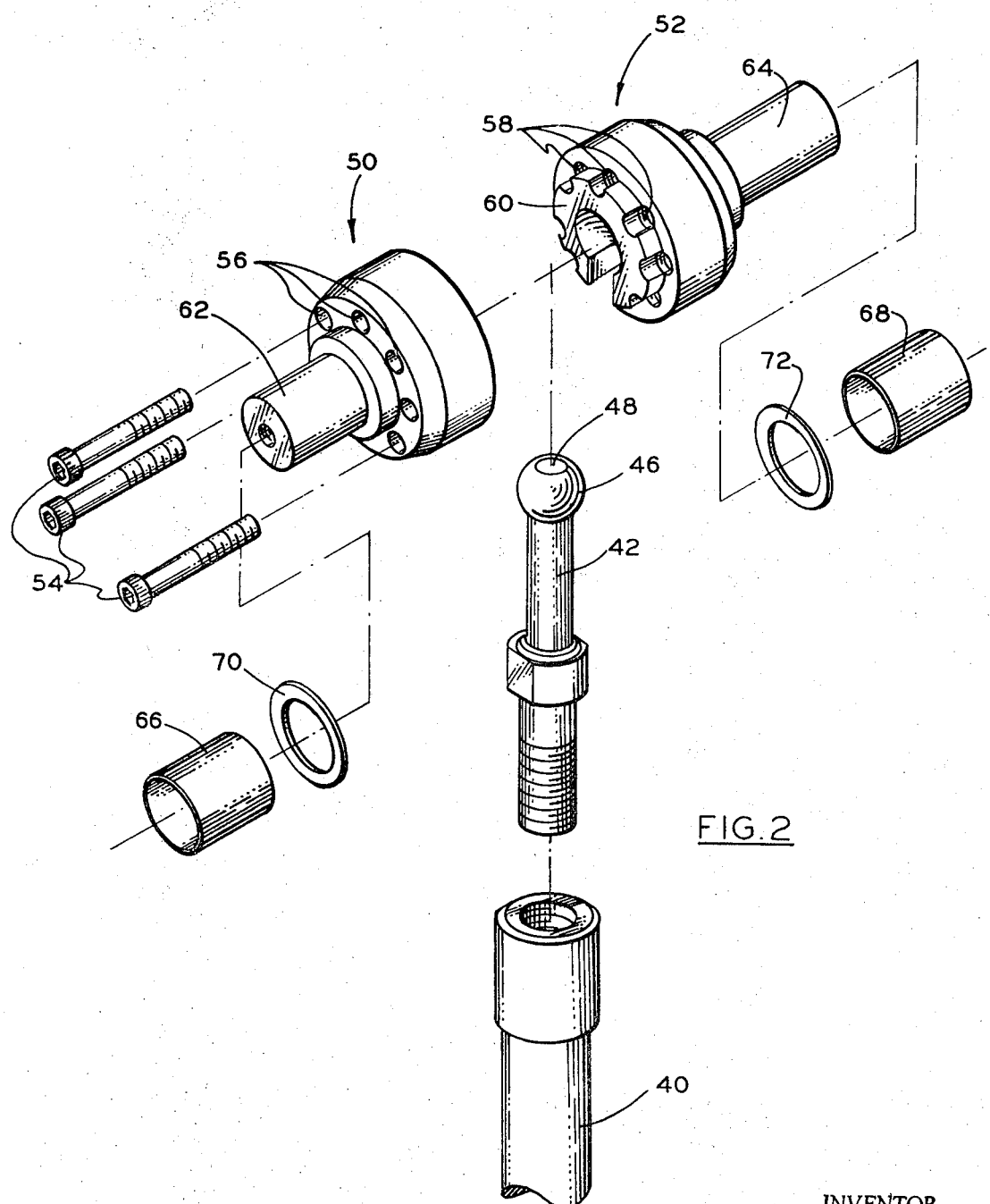
FIG. 2 is an exploded perspective view showing the constructional details of the individual elements of the invention in a preferred embodiment.

The joint connecting the end of actuator rod 40 to mount 32 is shown in detail in exploded perspective form in FIG. 2. The actuator rod end, comprising shank portion 42 terminating in substantially spherical ball 46 having flattened end surface 48, is threaded into actuator rod 40, thereby providing a means for fine adjustment of actuator length. Ball 46 is retained within housing means having a spherical internal socket opening at the lower end into an elongated slot (as shown later in more detail), formed by two cooperative sections designated generally by the reference numerals 50 and 52. The two sections are securely joined by means of a plurality of bolts 54 which pass through openings 56 in section 50 for threaded engagement in openings 58 in section 52. Section 50 includes a central recess for mating with an extending portion 60 of section 52, the latter including cutout portions in the periphery in alignment with openings 58.

Figure 3:
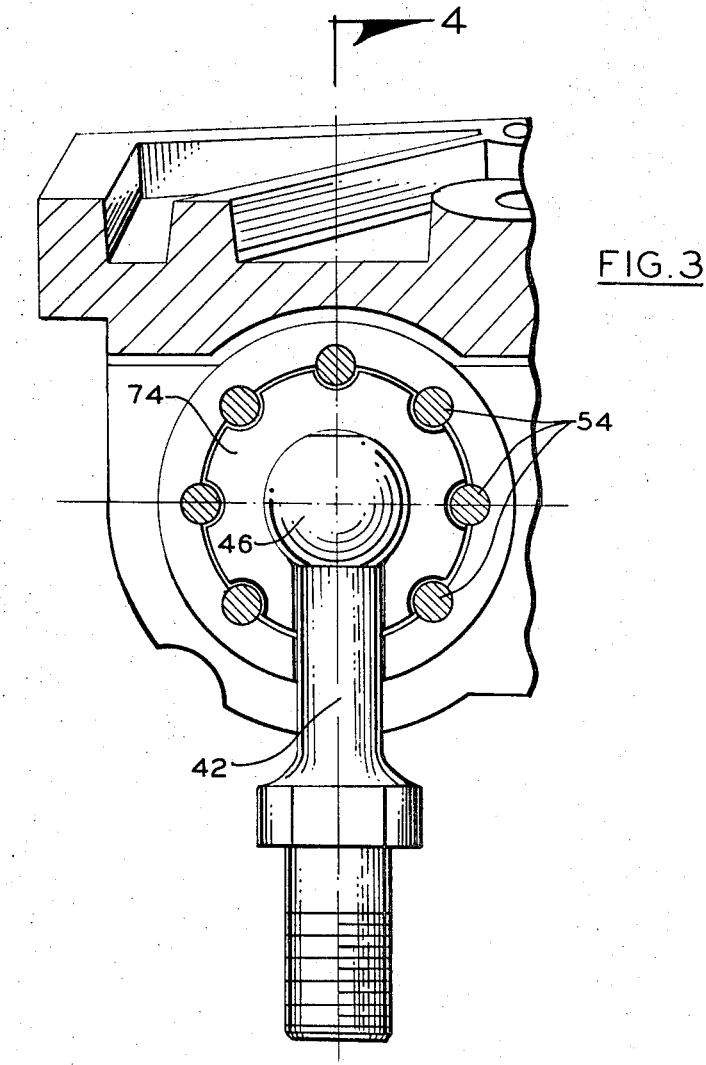
FIG. 3 is a sectional view of the assembled joint taken along the line 3–3 of FIG. 4.

Rigid cylindrical end portions 62 and 64 extend from sections 50 and 52, respectively, and are journaled in appropriate cylindrical bearings 66 and 68 within openings formed by mating sections of mount 32 (FIG. 4). Key washers 70 and 72 are provided between opposing surfaces of mount 32 and the end faces of sections 50 and 52 surrounding the cylindrical end portions, as are any shims required to limit end play of the sections within the mount. One or more additional shims 74 (FIG. 3) may be provided as required between the opposing surfaces of extending portion 60 on section 52 and the recess within section 50 to achieve a proper fit of ball 46 within the socket formed by the two mating sections. As best seen in FIG. 4, the ends of the openings in mount 32 within which cylindrical portions 62 and 64 are journaled, are sealed by end plates 76 and 78 which include grease fittings 80 and 82, respectively. Axial openings 84 and 86 are aligned with the grease fittings and extend through sections 50 and 52, respectively, to provide lubrication for ball 46 within the socket.

Figure 5:
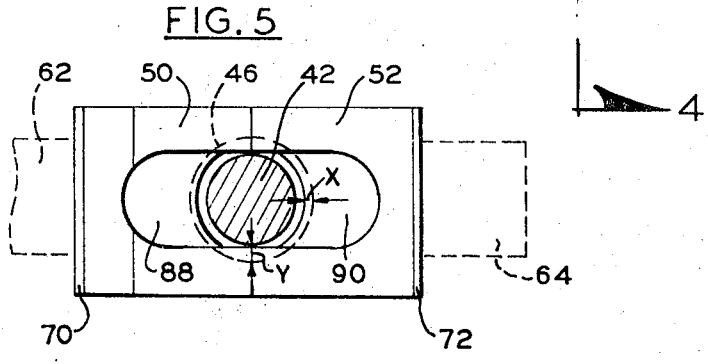
FIG. 5 is a bottom plan view of portions of the joint.

FIG. 5 illustrates the configuration of the opening formed by mating sections 50 and 52 through which shank 42 extends. The opening is in the nature of an elongated slot having a width only slightly greater than the diameter of shank 42 and having rounded end portions 88 and 90 which taper inwardly toward the spherical socket. Thus, as the motion platform is moved into various attitudes by cooperative extension and retraction of the several motion actuators, the axis of the actuator rod may be tilted with respect to the entire mounting structure, with ball 46 rotating within the socket, between the positions indicated by dotted lines 92 and 94 in FIG. 4. With the rod axis in the extreme position indicated by line 92, shank 42 contacts tapered end 88 of the portion of the opening in section 50; when the rod axis is in the position indicated by line 94, shank 42 engages end 90 of the opening in section 52, allowing a total relative motion excursion of about 88° in this direction in the illustrated embodiment.

Relative movement of the motion platform and actuator rod axis about a horizontal axis perpendicular to that just described results in rotation of sections 50 and 52 within mount 32. That is, there is no rotation of ball 46 within the socket since rod end 42 immediately contacts the side of the elongated opening through which it extends and rotates the entire gimbal formed by sections 50 and 52 within the openings in mount 32 wherein end portions 62 and 64 are supported. When the motion platform is rotated about the axis of shank 42, the mounting structure rotates about ball 46; that is, the rotational motion of the platform is transferred to mount 32 and sections 50 and 52, but there is no rotation of shank 42 or of actuator rod 40.

FIGS. 4 and 5 also indicate the extent of additional structure available to retain ball 46 within the socket with the joint configuration of the present invention. In order to achieve the indicated 88 degree relative excursion of the rod end and socket support structure it is necessary to taper the opening through which the shank extends to such an extent that the maximum dimension in plan view (FIG. 5) of structure retaining the ball within the socket is that represented by the letter x. If a conventional ball joint were used with an excursion requirement in all directions equal to that provided by the present joint in only one direction, the retaining structure would be of the same dimension around the entire periphery of the ball. However, a substantially larger dimension, indicated in FIG. 5 by letter y, is provided on each side of the ball by allowing rotation about one axis of the entire housing structure. The additional structure thus provided for retaining ball 46 within the socket may add several thousand pounds to the safe working load when the joint is in tension. Furthermore, as previously mentioned, the rotational capability of the joint about the axis of the actuator rod (i.e., rotation about such axis is within the joint and not within the cylinder) permits hydraulic pressure to be maintained on both the upper and lower sides of the piston within the actuator cylinder without danger of destroying or otherwise damaging the seals at the point where the actuator rod emerges from the cylinder.

I claim:

1. In a synergistic, six degree-of-freedom motion simulator having a plurality of extensible and retractable linear actuators extending between a fixed base and a motion platform, a joint structure for attaching one end of each of said actuators to said platform, said joint structure comprising, in combination;
   a. an actuator rod end terminating in a substantially spherical ball supported on a shank portion;
   b. a housing portion including a spherical socket for enclosing said ball, to allow rotation thereof about the axis of said rod end, and an opening through which said shank extends;
   c. said opening being in the form of an elongated slot having a width only slightly greater than the outside dimension of said shank passing therethrough, and a length sufficient to permit significant relative angular movement of said rod end and said housing portion about a first axis passing through said ball in a direction mutually perpendicular to the axis of said rod end and the elongated axis of said slot; and
   d. mounting means pivotally supporting said housing means upon said platform for rotation, through significant angular movement relative thereto, about a second axis passing through said ball and mutually perpendicular to said first axis and the axis of said rod end.

2. The invention according to claim 1 wherein said housing means is formed in two sections, each forming a portion of said spherical socket and said elongated slot.

3. The invention according to claim 2 wherein said shank is cylindrical and said elongated slot has rounded end portions tapering inwardly toward said spherical socket.

4. The invention according to claim 3 wherein said mounting means comprise a single axis gimbal-type support for said housing means.

5. The invention according to claim 4 wherein said significant angular movement about both said first and second axes is not less than about 80°.

6. A method of attaching one end of each of a plurality of extensible and retractable linear actuator rods to the motion platform of a synergistic, six degree-of-freedom motion simulator, said method comprising:
   a. providing a ball-and-socket connection by which a ball on said rod end is retained within a socket in a housing;
   b. constraining movement of said ball within said socket to rotation about two perpendicular axes, one of which is coaxial with the longitudinal axis of said actuator rod; and
   c. mounting said housing upon said platform for rotation about a third axis, mutually perpendicular to both of said two axes.

7. The invention according to claim 6 wherein said housing is mounted upon said platform by a single axis gimbal-type support affixed to said platform, whereby said actuator rods are movable with respect to said platform as a ball-and-socket connection in two degrees-of-freedom and as a gimbal connection in the third.